United States Patent [19]
Krude

[11] 4,012,924
[45] Mar. 22, 1977

[54] CONSTANT VELOCITY UNIVERSAL JOINT AND BALL RETAINER CAGE THEREFOR
[75] Inventor: Werner Krude, Neunkirchen, Germany
[73] Assignee: Lohr & Bromkamp GmbH, Offenbach (Main), Germany
[22] Filed: July 1, 1975
[21] Appl. No.: 592,238
[30] Foreign Application Priority Data
July 11, 1974 Germany .......................... 2433320
[52] U.S. Cl. .......................................... 64/21; 64/8
[51] Int. Cl. .............................................. F16d 3/30
[58] Field of Search ................................ 64/21, 8, 7
[56] References Cited
UNITED STATES PATENTS
3,370,441  2/1968  Aucktor ................................. 64/21
3,475,924  11/1969  Aucktor ................................. 64/21
3,488,979  1/1970  Croset ................................... 64/21

Primary Examiner—Samuel Scott
Assistant Examiner—R. Heald
Attorney, Agent, or Firm—Edmund M. Jaskiewicz

[57] ABSTRACT

A constant velocity universal joint has an outer joint member with a bore therethrough and an inner joint member within the bore. A plurality of torque transmitting elements, such as balls, are positioned within opposed grooves formed in the facing surfaces of the inner and outer joint elements. The balls are retained in a ball plane by means of a cage which has an inner concave surface guided upon a convex spherical surface of the inner joint member and an outer spherical surface guided within the bore. The outer spherical face of the cage has at least three circumferentially spaced guide ridges which are guided within a plurality of grooves formed within the bore of the outer joint member and between the ball grooves.

6 Claims, 4 Drawing Figures

CONSTANT VELOCITY UNIVERSAL JOINT AND BALL RETAINER CAGE THEREFOR

The present invention relates to constant velocity universal joints, more particularly, to the ball retainer cage for such a universal joint.

It has been known to provide a constant velocity universal joint comprising an outer joint member having a bore therethrough with an inner joint member being positioned within the bore. The bore and the outer surface of the inner joint member are each provided with a corresponding number of grooves such that a ball is positioned in each pair of opposed grooves to transmit torque. A cage is disposed between the joint elements and comprises a plurality of radial openings which retain the balls therein such that the centers of the balls are positioned in a plane perpendicular to the longitudinal axis of the cage and which bisects the bending angle between the inner and outer joint members. The cage has an inner concave spherical surface which is guided upon a convex spherical outer surface of the inner joint member or a control device positioned on the inner joint member. The cage is also provided with a spherical outer surface which is guided upon the bore surface of the outer joint member. The centers of the cage outer and inner spherical surfaces are positioned equidistantly on opposite sides of the ball plane.

It has been found that a disadvantage of such universal joints is that where the joint is to be used for large bending angles of the order of 50° or more, the wall thickness of the cage must be substantial in order to prevent the balls from dropping out when the joint is bent at the maximum angle. Such an increase in the thickness of the cage wall requires a corresponding reduction to be made in the depth of the groove receiving the torque transmitting elements. This reduction in the depth of the groove adversely affects the useful operating life of the joint and further decreases the torque transmitting characteristic of the joint.

It is therefore the principal object of the present invention to provide an improved constant velocity universal joint of the sliding or fixed type.

It is another object of the present invention to provide such a constant velocity universal joint which is capable of large bending angles but which has sufficient depth of the ball grooves to permit a long operating life.

The objects of the present invention are achieved and the disadvantages of the prior art are overcome by the constant velocity universal joint according to the present invention. Such a constant velocity universal joint as described above and which may be of the sliding or fixed type has formed on the first or outer spherical surface of the cage at least three circumferentially spaced guide ridges each of which is positioned between a pair of torque transmitting balls. The diameter of the cage outer spherical surface is greater than the smallest diameter of the bore within the outer joint element. The bore of the outer joint element has a plurality of second grooves therein corresponding in number and spacing to the guide ridges and each second groove is located between two ball grooves. The second grooves each have a diameter corresponding to the diameter of the cage outer spherical surface so that the cage is guided by the coaction of its guide ridges in the second grooves of the outer joint element.

The present invention thus has the advantage that the centers of the outer and inner spherical surfaces of the cage may be more widely spaced apart on opposite sides of the ball plane so that long sliding distances may be combined with wide bending angles and good control of the joint obtained by favorable leverage conditions. In addition, the ball grooves can be made relatively deep in order to obtain a significant increase in the operating life and torque transmitting capacity of the joint.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment of the present invention will be described in detail.

Figure 1:
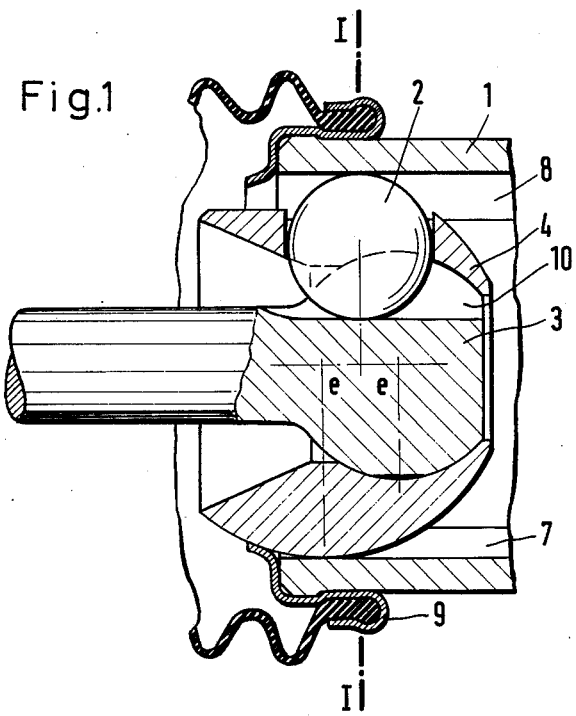
FIG. 1 is a longitudinal sectional view taken along the line II—II of FIG. 2 of a constant velocity universal joint incorporating the present invention.
Figure 2:
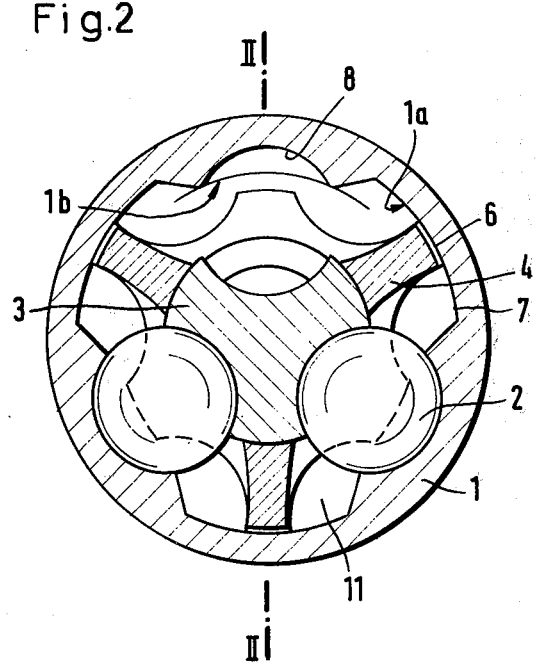
FIG. 2 is a sectional view taken along the line I—I of FIG. 1.

In FIGS. 1 and 2 there is shown a constant velocity universal joint which incorporates the present invention and which comprises an outer joint element 1 through which is an axially extending cylindrical bore 11. Circumferentially spaced in the surface of the bore 11 there are formed a plurality of ball or track grooves 8 and second grooves 7 all of which are parallel with the longitudinal axis of the bore. An inner joint element 3 is positioned within the bore 11 and has a spherical outer surface in which are formed a plurality of longitudinally extending ball grooves 10. A ball retainer cage 4 is positioned between the outer joint element 1 and the inner joint element 3. The cage 4 has a spherical inner concave surface 12 which is guided upon the outer spherical surface of the inner joint element 3. Within the cage is a plurality of circumferentially spaced radial openings 5 within which are retained the torque transmitting balls 2 each of which is received in two mutually opposite ball grooves 7 and 8 of the outer and inner joint members 1 and 3.

In addition to the foregoing structure which is generally known in the art the cage 4 is provided with a guide ridge 6 between each pair of adjacent balls 2. The centers of the inner and outer radii of the guide ridges 6 are located at equidistances $e$ on opposite sides of a plane passing through the centers of the torque transmitting balls 2 and which is perpendicular to the longitudinal axis of the joint. The guide ridges 6 are received in the correspondingly shaped grooves 7 of the outer joint member 1.

Figure 3:
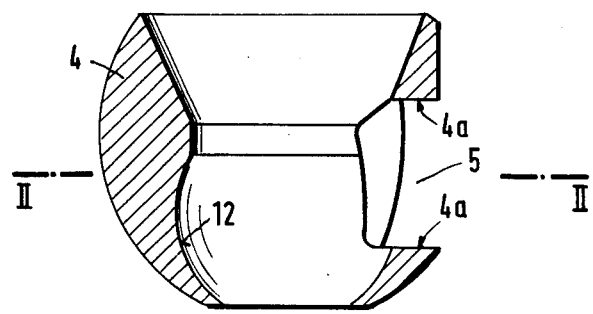
FIG. 3 is a longitudinal sectional view of the ball retainer cage according to the present invention which is utilized in the joint of FIG. 1.
Figure 4:
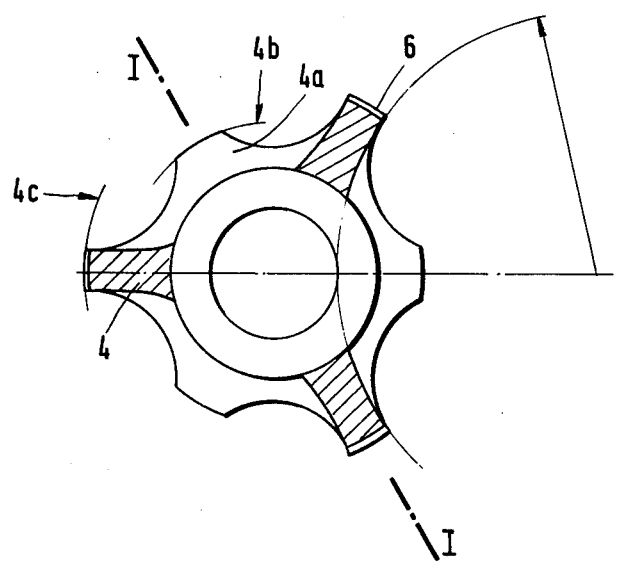
FIG. 4 is a sectional view taken along the line II—II of FIG. 3.

In FIGS. 3 and 4 the cage 4 is shown with its inner spherical concave surface 12 and the ball openings 5 which are worked by a suitable machining operation to form the guide ridges 6 as indicated in FIG. 4. The guide ridges 6 for guiding the cage 4 are in each case positioned between a pair of ball openings 5 having corresponding ball engaging surfaces 4a.

Preferably, there are at least three circumferentially spaced guide ridges 6 on the cage as illustrated in the present embodiment of the invention. The diameter of the spherical outer surface of the cage and thus of the guide ridge is greater than the smallest diameter of the bore through the outer joint element. The diameter of the bases of the grooves 7 of the outer joint element corresponds to the diameter of the spherical outer surface of the cage so that the cage is guided by its guide ridges 6 coacting within the grooves 7.

The present invention further provides that the width of the grooves 7 formed in the outer joint element should depend upon the bending angle to which the joint will be subjected. The guide ridges 6 are preferably formed during a suitable machining operation which works out the ball openings 5 of the cage. It is pointed out that the several steps in machining the cage require only a single setting or gripping operation since the ball openings are worked tangentially from an axis which is parallel to the axis of rotation of the cage and is indicated by the arrow in FIG. 4.

It is to be noted that the bore through the outer joint element is cylindrical and that all of the grooves in this bore are parallel with the longitudinal axis of the bore. The grooves may be formed in a single operation, such as by broaching which eliminates the necessity for additional machining or other processing operations. Thus, the grooves 7 for the guide ridges 6 are formed at the same time as the ball grooves 8 and the entire assembly is fitted together in the axial direction.

When the joint is of the sliding type the length of the outer joint element is selected in accordance with the sliding displacement. When the joint is of the non-sliding or fixed type, the cage is non-rotatably retained with respect to the outer joint element such as by the annular ring 9 shown in FIG. 1. It is pointed out that the same outer joint element structure may be used both for sliding and fixed joints of this type. In order to form the non-sliding or fixed joint it is merely necessary to fix the cage against axial displacement by suitable structure as known in the art.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint element having a bore therethrough and a plurality of grooves in the surface of said bore, an inner joint element within said bore and having a plurality of grooves in its outer surface corresponding in number to and opposed from said outer joint element grooves to define pairs of opposed grooves, a plurality of balls between said joint elements with each ball being in a pair of opposed grooves, a cage between said joint elements and having a plurality of radial openings therein to retain said balls in a plane which is perpendicular to the axis of the cage and which bisects the angle between the joint elements, said cage having a first spherical surface on its outer face and a second spherical surface on its inner face, means on the inner face of said outer joint element coacting with said cage first spherical surface for guiding said cage with respect to said outer joint element, said inner joint element having convex spherical outer surface means for coacting with said cage second spherical surface, the centers of said first and second cage spherical surfaces being equidistant on opposite sides of said ball plane, said cage first spherical surface comprising at least three circumferentially spaced guide ridges thereon each positioned between a pair of balls and the diameter of said cage first spherical surface and said guide ridges being greater than the smallest diameter of said bore within said outer joint element, said outer joint element bore having a plurality of second grooves therein corresponding in number and spacing to said guide ridges and each second groove being between two ball grooves, said second grooves having a diameter corresponding to the diameter of said cage first spherical surface so that said cage is guided by coaction of its said guide ridges in said second grooves.

2. A constant velocity universal joint as claimed in claim 1 wherein the width of said second grooves is selected with respect to the bending angle of the universal joint.

3. A constant velocity universal joint as claimed in claim 1 wherein the portions of the cage having said openings are worked to define said guide ridges.

4. A constant velocity universal joint as claimed in claim 1 wherein said bore is cylindrical and said second grooves are parallel to the longitudinal axis of said bore.

5. A constant velocity universal joint as claimed in claim 1 wherein the joint is of the sliding type and the length of said outer joint element is selected with respect to the sliding displacement between said inner and outer joint elements.

6. A constant velocity universal joint as claimed in claim 1 wherein the joint is of the non-sliding type and means for retaining said cage against axial displacement with respect to said outer joint element.

* * * * *